May 26, 1942.  O. E. FISHBURN  2,284,191
VARIABLE SPEED TRANSMISSION MECHANISM
Filed May 2, 1940  4 Sheets-Sheet 1
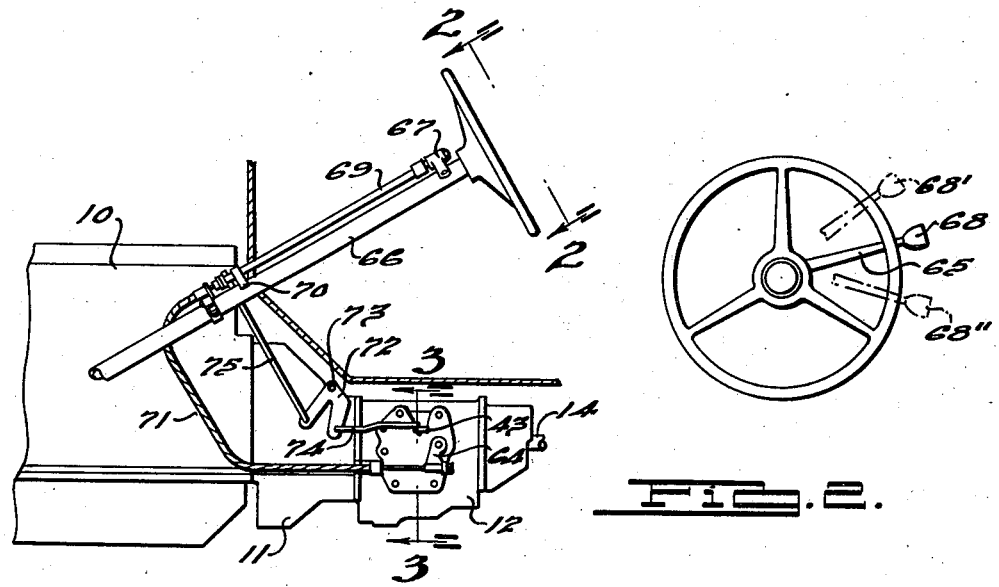
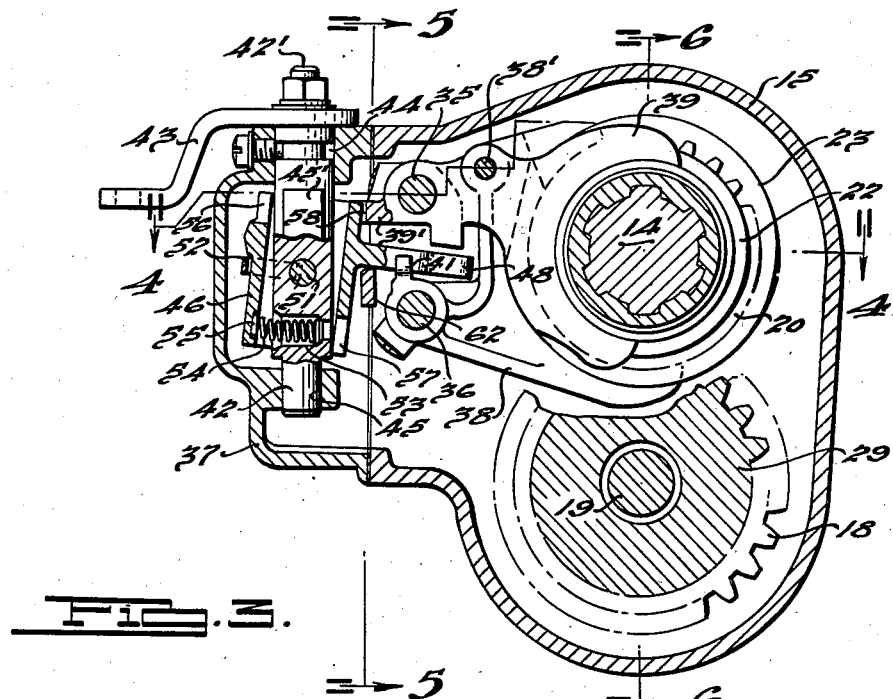
INVENTOR
Otto E. Fishburn.
BY
ATTORNEYS.

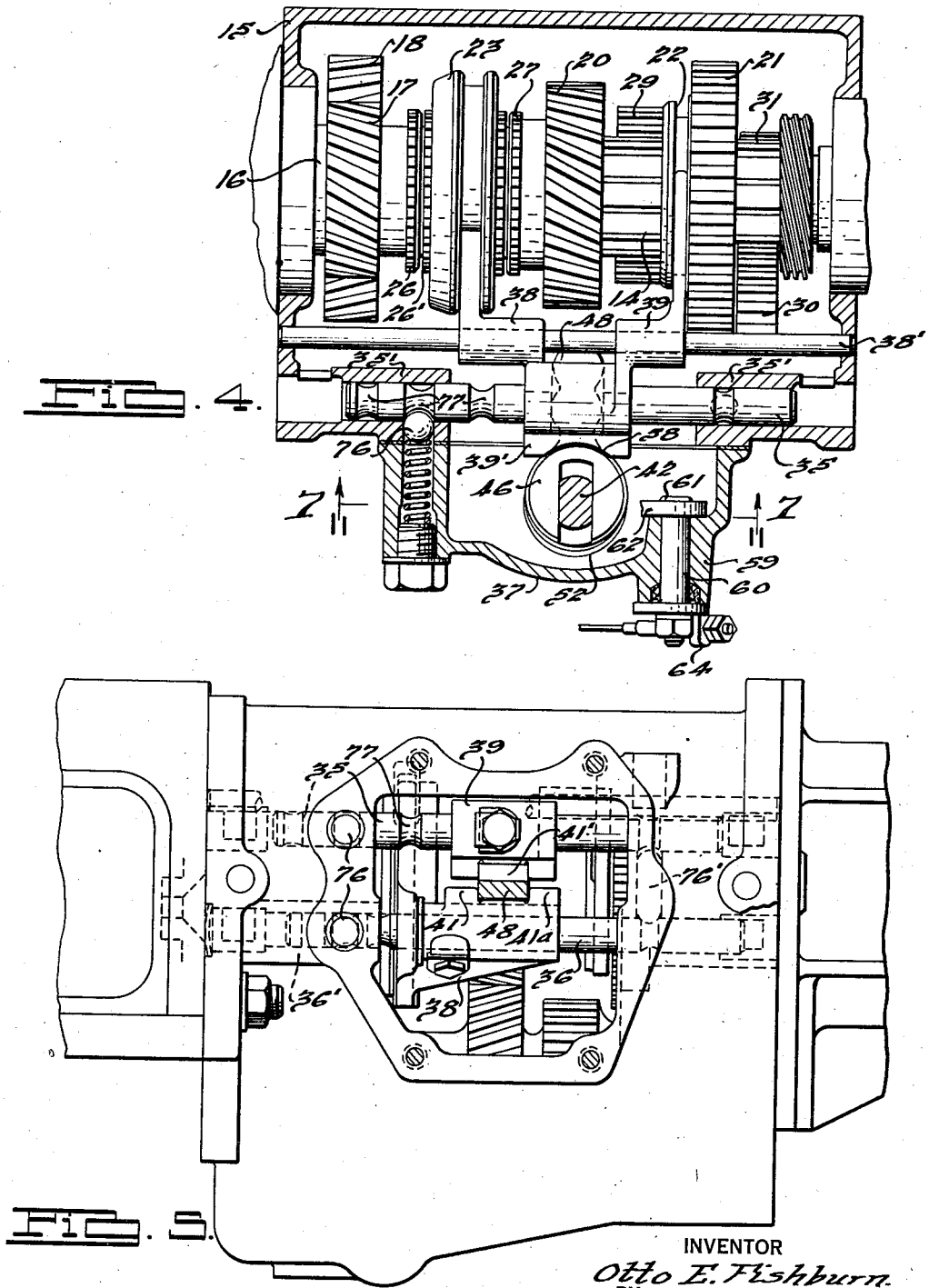

May 26, 1942. O. E. FISHBURN 2,284,191
VARIABLE SPEED TRANSMISSION MECHANISM
Filed May 2, 1940 4 Sheets-Sheet 3

INVENTOR
Otto E. Fishburn.
BY Hamess, Lind, Patee & Harris
ATTORNEYS.

May 26, 1942.   O. E. FISHBURN   2,284,191
VARIABLE SPEED TRANSMISSION MECHANISM
Filed May 2, 1940   4 Sheets-Sheet 4

INVENTOR
Otto E. Fishburn.
BY Harness, Dind, Patu & Harris
ATTORNEYS.

Patented May 26, 1942

2,284,191

UNITED STATES PATENT OFFICE 2,284,191

VARIABLE SPEED TRANSMISSION MECHANISM

Otto E. Fishburn, Detroit, Mich., assignor to Chrysler Corporation, Highland Park, Mich., a corporation of Delaware Application May 2, 1940, Serial No. 332,910

12 Claims. (Cl. 74—477)

This invention relates to improvements in variable speed transmission mechanism of the type particularly adapted for use in motor vehicles.

The principal object of the invention is to provide an improved selector and shifter mechanism for the transmission shift rails which will be positive in action, smooth in operation and economical to manufacture.

An additional object is to provide a selector and shifter mechanism which functions automatically when brought to neutral position to lock one of the transmission shift rails against movement.

A further object is to provide in a selector and shifter mechanism of the aforesaid type improved means for retaining the shift finger in engagement with a selected one of the shift rails which means is also operable to lock the other shift rail against movement.

A still further object is to provide in a mechanism of the aforesaid type operating members which rotate during shifting of the transmission gears and in which no sliding of the parts is necessary.

Further objects and advantages of the invention will be apparent from the following description taken in conjunction with the accompanying drawings, in which:

Fig. 1 is a diagrammatic, fragmentary, vertical sectional view of a motor vehicle embodying the present invention.

Fig. 2 is a plan view of the steering wheel and shift lever assembly as viewed in the direction of the arrows 2—2 in Fig. 1.

Fig. 3 is a sectional view taken along line 3—3 of Fig. 1.

Fig. 4 is a sectional view along line 4—4 of Fig. 3.

Fig. 5 is a sectional view along line 5—5 of Fig. 3.

Figure 6:
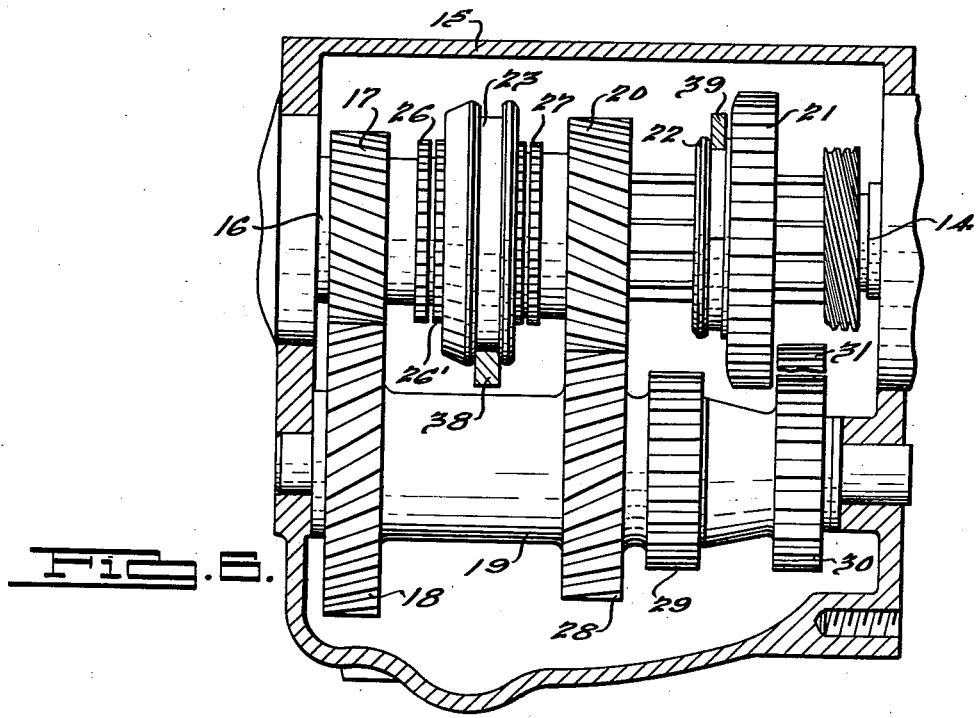
Fig. 6 is a sectional view along line 6—6 of Fig. 3.

In the drawings is illustrated an embodiment of the invention in a motor vehicle drive including a unitary power plant having an engine 10, clutch 11 and transmission mechanism, generally designated by the numeral 12, a drive shaft 14 extending rearwardly from the transmission to the rear wheels (not shown) of the vehicle.

The transmission 12 includes a housing 15 (Fig. 6) into which extends a driving shaft 16, having a gear 17 meshed with a gear 18 fixed on a countershaft 19 which is journalled at its opposite ends in apertures in the end walls of the housing 15. The driven shaft 14 extends into the housing 15 and has a gear 20 journalled on its internal end portion. A slidable gear 21, disposed on the right side of the gear 20 and splined on the shaft 14, is provided with a shifter fork receiving collar 22. Formed on the adjacent sides of the gears 17 and 20 are hub portions which are provided with external clutch teeth 26 and 27 respectively. Splined on the shaft 14 is a hub member having teeth 26'. A shiftable clutch member 23 is splined on the hub member at a location between the hub portion of the gears 17 and 20 and provided with internal clutch teeth with which the clutch teeth 27 and 26 respectively are adapted to be selectively meshed as is well known in the art. A direct drive setting of the gears may be produced by shifting the clutch member 23 to the left, as viewed in Figs. 4 and 6, to connect the clutch teeth 26 with the teeth 26'. When the clutch member 23 is shifted to the right, the teeth 27 and 26' are connected thereby holding the gear 20 against rotation relative to the shaft 16. The gear 20 is permanently meshed with a gear 28 on the countershaft 19 by which the gear 20 and shaft 14 are driven to establish a second speed drive. Low speed and reverse settings of the transmission may be established by shifting the gear 21 into mesh with a gear 29 on the countershaft 19 and with a reverse gear 31 driven by a pinion 30 on the countershaft respectively.

A pair of shifter rails 35 and 36 extending longitudinally of the transmission at one side thereof are shiftably mounted in bosses 35' and 36' of the housing 15. A pair of laterally extending shifter forks 38 and 39 are slidably mounted on a rod 38' fixed in the housing at each end thereof, and respectively engage the grooves of the shift collars 23 and 22 as illustrated. The fork 38 is provided with a pair of spaced lugs 41 and 41ª between which is receivable a rail shifting finger 48, which also has a part which is receivable into a notch 41' in the fork 39. As is clearly shown in Fig. 5, the lug 41ª is of greater height than lug 41. This feature has an important bearing on the operation of the transmission and facilitates easy shifting thereof. It will be more fully described later on in this specification.

That portion of the control apparatus which is directly connected with the transmission mechanism housing is mounted on a cover 37 which is provided for closing the side opening of the transmission housing. The cover 37 includes a crowned central portion having opposite top and bottom wall portions extending longitudinally of the transmission in which are formed registering openings 44 and 45.

A shaft 42 is journalled at each end in openings 44, 45 provided in the cover 37 and has an upper external end portion 42' protruding from the cover to which is non-rotatably fixed a shift lever 43. The shaft 42 is provided on each side with flat surfaces as indicated at 45' which form part of a non-rotatable driving connection between the shaft 42 and a trunnion member 46 carried by the shaft for rocking movement about an axis disposed at right angles to the axis of the shaft. The trunnion member 46 has the rail shifting finger 48, heretofore referred to, formed integrally therewith and the latter is provided with an intermediate lobe portion 49 (Fig. 8) receivable between the lugs 41—41ª of the shift yoke 38 carried by rail 36 and an outer lobe portion 50 adapted to be received by the notch 41' of the yoke 39 carried by rail 35.

Figure 8:
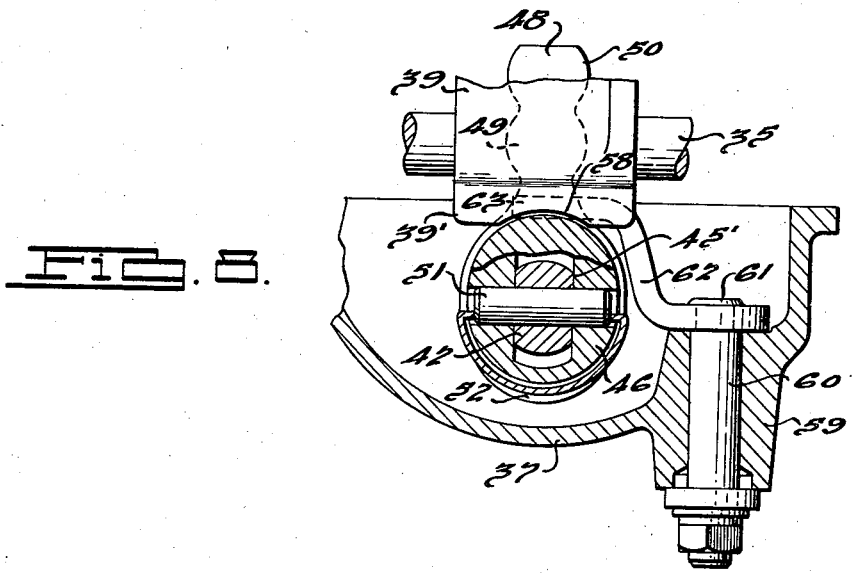
Fig. 8 is a sectional view along line 8—8 of Fig. 7.

The trunnion member 46 is rockably mounted on the shaft 42 by means of a trunnion pin 51 which is received by aligned holes provided in the shaft 42 and trunnion member 46 as illustrated in Fig. 8, a spring clip 52 serving to retain the pin against escape. The shaft 42 is also provided with a bore 53 in which is received a coil spring 54 which seats in a pocket 55 formed in the trunnion member 46 as illustrated in Fig. 3. The spring 54 serves to yieldably urge the trunnion member 46 to the position shown in Fig. 3 wherein the shift finger 48 is engaged with the shift yoke 38, the member 46 being cut away at 56 and 57 to accommodate rocking thereof.

The shift yoke 39 which is carried by the rail 35 is, as aforesaid, provided with a notch 41' for receiving the finger 48. In addition, yoke 39 is provided with an integral extension 39' having an arcuate recess 58 into which is received the top marginal portion of the trunnion member 46 when the latter is in the Fig. 3 position. When in this position, therefore, rotation of the shaft 42 will shift the rail 36 while the rail 35 remains locked against shifting because of the engagement of the trunnion member 46 with the portion 39' of yoke 39. The rail 36 is the second-high speed rail and in order to shift the low-reverse speed rail 35, it is, of course, necessary to rock the trunnion member 46 about the pin 51 against the pressure of spring 54 to engage the finger 48 with the notch 41' and disengage the top portion of member 46 from the arcuate recess 58, which action is accomplished by the means about to be described.

Figure 7:
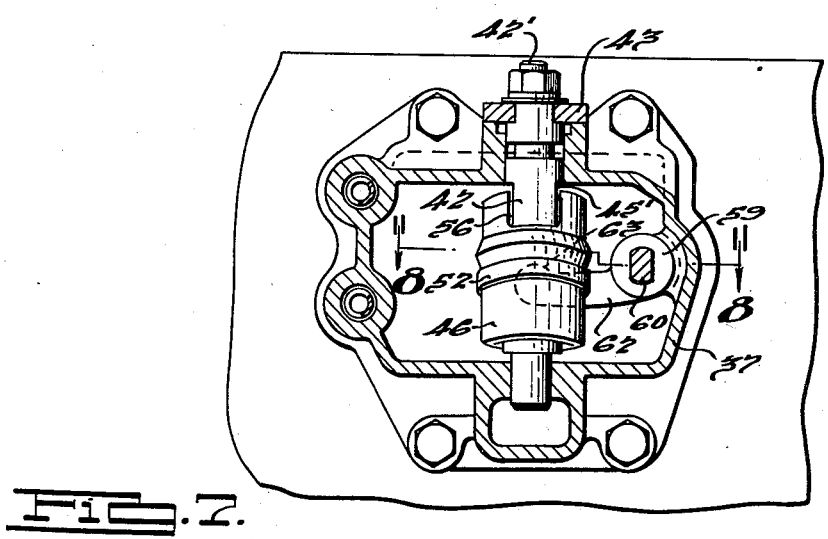
Fig. 7 is a sectional view taken along line 7—7 of Fig. 4.

As illustrated in Figs. 4, 7 and 8, the cover 37 has a transversely extending boss 59 in which is rotatably mounted a shaft 60 having a flattened inner end 61 on which is carried an arm 62. The latter has a rounded end portion 63 which engages the under side of the finger 48. A selector lever 64 (Figs. 1 and 4) is non-rotatably mounted on the outer end of the shaft 60 for actuation by the driver through means about to be described.

Apparatus for manually actuating the trunnion member 46 may be mounted at any location in the driver's compartment of the vehicle within convenient reach of the driver. Any suitable apparatus may be used, that being shown in Figs. 1 and 2 preferably being employed, although any suitable apparatus such as that shown in the copending application of Frederic W. Slack, Serial No. 293,657, filed in the United States Patent Office on September 7, 1939 may be employed.

In Figs. 1 and 2, the manual control apparatus comprises a gear shift lever 65 which is carried on the steering column 66 of the vehicle by means of a bracket 67. The manual control lever is preferably of stamped construction and has a knob 68 on its outer end. The inner end of the aforesaid lever is pivotally mounted on the steering column 66 and is operatively connected with a rod 69 which is carried on the steering column 66 in parallel relation thereto by means of the bracket 67 and a bracket 70 carried by the lower portion of the steering column. Suitable mechanism is provided such that rocking of the lever 65 in a direction generally parallel with the axis of the steering column 66 will cause the rod 69 to be reciprocated axially of the steering column. A Bowden cable assembly 71 operatively connects the selector lever 64 with the rod 69 and is adapted to transmit motion between the rod 69 and the lever 64. A bellcrank lever 72 is pivotally mounted on the clutch housing 11 at 73 and has an arm connected with the transmission shift lever 43 by means of a link 74 and a second arm connected with the rod 69 by a link 75. The arrangement is such that rocking of the rod 69 about its longitudinal axis will cause a corresponding rocking motion of the bellcrank 72 and the transmission shift lever 43.

When the knob 68 of the manually operated shift lever 65 is in the full line position as illustrated in Fig. 2, movement thereof in a counterclockwise direction about the axis of the rod 69 to the position designated 68' in Fig. 2 will impose a pull on the links 75 and 74 which will in turn swing the shift lever 43 forwardly about the axis of the shaft 42. This in turn will cause the shift rail 36 to be moved toward the right of Figs. 4 and 5 so as to engage the clutch sleeve 23 with the teeth 27 to thereby establish a second speed ratio setting of the transmission. When the knob 68 is moved in a clockwise direction to the position designated 68'', the links 75—74 will push the lever 43 rearwardly and the rail 36 will be shifted toward the left of Figs. 4 and 5 to engage the clutch sleeve 23 with the teeth 26 to thereby establish a direct drive setting of the transmission. Suitable detent mechanism indicated at 76 in Figs. 4 and 5 is adapted to engage recesses 77 provided in each of the shift rails 35 and 36 for yieldably maintaining the rails in the desired positions.

Upward movement of the manually operated lever 65 about its fulcrum in the bracket 67 will cause rod 69 to be moved axially upwardly and, through the Bowden cable 71, will swing the selector lever 64 forwardly about the axis of the shaft 60, thereby swinging the arm 62 upwardly to rock the trunnion member 46 about the axis of pin 51 against the pressure of spring 54, this action disengaging the lobe 49 of shift finger 48 from the second-high speed rail 36 and engaging the lobe 50 thereof with the low-reverse speed rail 35, at the same time disengaging the upper marginal inner portion of the trunnion member 46 from the arcuate recess 58 of the shift yoke portion 39'. Counterclockwise swinging movement of the shift lever 65 under these conditions will, through the intermediary of the links 74—75 and the bell-crank lever 72, move the shift rail 35 toward the right of Figs. 4 and 5 and 6 to mesh the gear 21 with reverse idler gear 31 thereby to establish a reverse setting of the transmission. Clockwise movement of the lever 65 to the position 68" while holding the said lever in its upper-most position will likewise move the rail 35 leftwardly of the said figures to mesh the gear 21 with gear 29 thereby establishing low speed ratio setting of the transmission.

Referring to Fig. 5, it will be seen that in shifting the rail 35 into low and reverse speed drive positions, it is not necessary for the driver to hold the spring 54 compressed except during the initial shifting movement of the rail. As soon as the rail 35 has moved to the left or right of Fig. 5 far enough to misalign the notch 41' with the oppositely disposed notch between the lugs 41—41ᵃ, the finger 48 will be retained in operative engagement with the notch 41' by the lugs 41—41ᵃ throughout its range of shifting movement on either side of neutral position. In other words, the shift lever 65 need only be held upwardly against the force of spring 54 during shifting of the transmission into low or reverse setting long enough to engage finger 48 in notch 41' and to initially move rail 35 out of neutral position, the swinging movement of shift lever 65 for shifting the rail 35 may then be continued with the knob 68 in the lower of its two parallel paths of shifting movements, this action being readily accommodated in the linkage because the arm 62 is not positively connected to the trunnion member 46.

The manually operable shift mechanism illustrated in Figs. 1 and 2 is more fully described in the aforesaid Frederic W. Slack application, Serial No. 293,657.

A suitable interlock 76' (Fig. 5) is provided to lock one of the shifter rails against accidental movement while the other is being shifted.

In describing the operation of the device, let it be assumed that the motor vehicle is at rest with the motor running and the manually shiftable lever 65 positioned in the neutral position as indicated in full lines in Fig. 2. In starting the vehicle, the operator depresses the clutch pedal in the usual manner and grasps the knob 68 of lever 65 and rocks the lever about its fulcrum in the bracket 67 longitudinally upwardly of the steering column. This action causes rod 69 to be moved longitudinally upwardly of the steering column and exerts a pull on the cable 71 to thereby swing the selector lever 64 forwardly about the axis of the shaft 60, this action compressing the spring 54 and rocking the trunnion member 46 about the pin 51 thereby to disengage the shift finger from rail 36 and engage it with rail 35, at the same time unlocking rail 35 for shifting movement. Shift lever 65 is then pulled backwardly or clockwise of the steering column 66 which action rotates the rod 69 and, through the intermediary of the link 75, bellcrank lever 72 and link 74, swings the transmission shift lever 43 rearwardly thereby effecting rotation of the shaft 42 and trunnion member 46 to shift rail 35 with which the finger 48 is now operatively connected to mesh gear 21 with gear 29 to establish low speed drive through the transmission. Engagement of the vehicle clutch (not shown) will then cause the vehicle to be driven forwardly in low gear.

The knob 68 is now in first speed position as indicated by the numeral 68" in Fig. 2 and release of this knob by the driver will allow it and lever 65 to fall longitudinally downwardly relative to the steering column 66 into high speed position, which position is directly below the low speed position. A suitable spring or other yieldable means may be incorporated in the manual shift mechanism to facilitate this action if desired. The arm 62 will return to the position shown in Fig. 3 even though the shift finger 48 is retained in its upper position because of engagement of the bottom surface thereof with the top surface of lug 41ᵃ because of the fact that the arm 62 bears on the bottom surface of the finger 48 but is unconnected thereto.

It will thus be apparent that the shift from low speed to second or intermediate speed may be made by a single forward or counterclockwise movement of the knob 68 from the position 68" to the position indicated at 68' in Fig. 2, such movement taking place in the lower path of movement of the knob 68. As soon as the knob 68 has moved from the position 68" to neutral position, gear 21 will have been moved out of meshing engagement with gear 29 and the shift rail 35 will be in neutral position. Shift finger 48 will then be released from the notch 41' and trunnion member 46 will be rocked about the pin 51 to the position shown in Fig. 3 under the influence of spring 54 thereby to engage finger 48 with rail 36 and at the same time engage the top marginal inner portion of the member 46 with the arcuate recess 58 of the yoke portion 39'. Movement of the knob 68 forwardly to the position 68' will rock the rod 69 in a counterclockwise direction and through the associated linkage, clutch member 23 will be moved rearwardly of the transmission to clutch with the teeth 27 thereby establishing second speed drive. It will be understood that this shifting movement from low speed setting to second speed setting of the transmission can be accomplished with extreme rapidity because of the fact that lever 65 may be moved counterclockwise about the axis of rod 69 without the necessity of "feeling" through the cross-over which connects the two paths of movement of the lever 65 as is usual in shifting mechanisms of the prior art. Thus it may be seen that the shift from first to second speed may be accomplished with smoothness and rapidity and because of the fact that the lever 65, rod 69, cable 71, lever 64 and arm 62 are returned to the respective positions corresponding to the lower path of movement of the knob 68 immediately after the transmission has been shifted into low speed. The spring 54 is required only to rock the trunnion member 46 about the pin 51 in order to effect the cross-over of the shift finger 48 from rail 35 to rail 36. Thus the spring 54 is relieved of all frictional load except that incident to the rock of the trunnion member 46 on the pin 51 and a very rapid and desirable "snap-over" action of the finger 48 results.

This "snap-over" or, as it is sometimes referred to, "automatic cross-over" action of the finger 48 is facilitated by the difference in height between the lugs 41 and 41ᵃ. As is apparent from Fig. 5, as the rail 35 is shifted from left to right with the shift finger 48 in its upper position with the bottom surface thereof resting on the top surface of the lug 41, the finger 48 will engage the side of lug 41ᵃ when it reaches neutral position. At this instant, the spring 54 will snap the trunnion member 46 and the finger 48 clockwise (as viewed in Fig. 3) about the pin 51 thereby disengaging the finger from yoke 39 and engaging it with yoke 38 while at the same time locking the rail 35 and yoke 39 against further movement by engagement of the trunnion member 46 with the portion 39' of yoke 39. It is thus apparent that the shift from first to second speed may be accomplished with knob 68 in its lower path of movement, unintentional shifting into reverse being prevented by the lug 41ª which engages the finger 48 when the latter reaches neutral position as aforesaid.

The above described mechanism avoids difficulties prevalent in the prior art which hamper the accomplishment of a fast shift from low speed to second speed. Heretofore, attempts to provide an automatic cross-over from the low speed rail to the high speed rail in the transmission has been accompanied by difficulties in operation especially when the vehicle was used in the winter time under cold climates under such conditions that the grease in the transmission became thick. Under such conditions, it frequently happened that the shift finger would not disengage from the low speed rail upon coming to neutral position but would remain in engagement therewith, thereby causing clashing of the gear 21 with the reverse idler gear 31 which, when the vehicle is travelling forwardly, are rotating in opposite directions. Another difficulty resided in the tendency (in both warm and cold weather driving conditions) for the low speed rail 35 to continue its movement toward the right as viewed in Fig. 5 after the shift finger 48 had disengaged the shift yoke. This difficulty was due to the momentum imparted to the rail 35 during the movement thereof from low speed position to neutral position which momentum caused the rail to continue its movement past neutral position and toward reverse position after the shift finger had moved into engagement with high speed rail 36. This undesired movement of the rail 35 frequently resulted in lock-up of the transmission parts due to jamming of the interlock pin 76'; and damage to the gears 21 and 31 besides making it virtually impossible to accomplish a rapid and positive shift from low speed to second speed such as is frequently required under modern driving conditions in heavy traffic.

The present arrangement entirely eliminates the aforesaid difficulties because the low speed rail 35, together with its associated mechanism, is positively locked in neutral position by engagement of the inner marginal top portion of the trunnion member 46 with the arcuate recess 58 of the yoke portion 39' of yoke 39 at all times when the shift finger 48 is engaged with high speed rail 36. Movement of the transmission shift lever 43 to rotate shaft 42 and trunnion member 46 for shifting sleeve 23 does not effect this locking arrangement because of the arcuate relationship between the trunnion member 46 and the yoke portion 39'. Therefore during a fast shift from low speed to second speed, shift finger 48 will be snapped out of engagement with the yoke 39 and into engagement with the yoke 38 at the instant the parts come to neutral position and simultaneously the top portion of trunnion member 46 will engage yoke portion 39' thereby making it impossible for rail 35 to continue moving past neutral position.

Because of the novel trunnion relationship between the trunnion member 46 and the shaft 42, the spring 54 is required to overcome only the friction incident to rocking of the member 46 on the pin 51. This results in an extremely rapid and positive selector action of the member 46 and is a vast improvement over arrangements known to the prior art wherein sliding friction had to be overcome during the cross-over action.

The shift from second speed to high speed setting of the transmission is accomplished by movement of the knob 68 from the position 68' to the position 68" while the knob is in its lower path of movement. This results in rearward swinging of the lever 43 through the intermediary of links 75, bellcrank lever 72 and link 74 and moves clutch sleeve 23 forwardly to mesh with the teeth 26.

Figure 9:
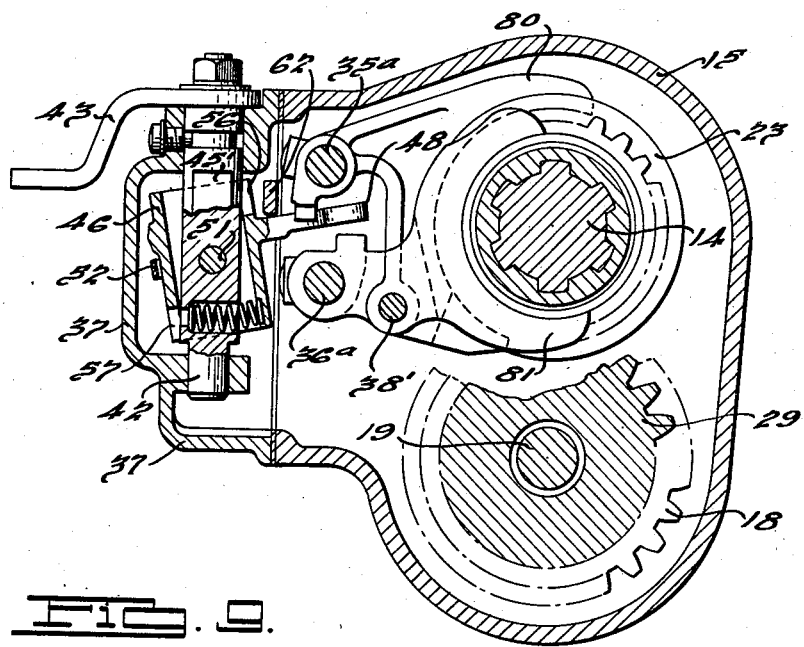
Fig. 9 is a view similar to Fig. 3 but illustrating a modified form of the invention.

Fig. 9 shows a modified form of the invention which differs slightly from the form just described in that the trunnion member is biased in the opposite direction. In Fig. 9, the trunnion member 46 is mounted on the shaft 42 in a manner similar to that just described and has an integrally formed shift finger 48 adapted for engagement with shift yokes 80—81.

This arrangement is particularly suitable for transmissions of the two speed forward and reverse type and no lock is provided because no cross-over action of the finger 48 takes place except when shifting into reverse, the preferred arrangement being such that both forward speeds are controlled by shift of rail 35ª, rail 36ª controlling the shift into reverse only. The selector arm 62 is, of course, arranged to push downwardly instead of upwardly, as in the Fig. 3 modification. If desired, a lock may be provided for the rail 36ª of the type shown in Fig. 3.

Various changes will undoubtedly occur to those skilled in the art and it is not intended to limit the invention in its broader aspects to the precise details shown and described herein, the scope of the invention being set forth in the claims appended hereto.

I claim:

1. In a motor vehicle power transmission having a pair of selectively operable drive control elements, a pair of rails mounted for shifting movement relative to each other along parallel axes, means operably connecting said rails respectively with said drive control elements, an operating member mounted for oscillatory movement about an axis transverse to said parallel axes to impart shifting movement to said rails, a selector element pivotally mounted on said operating member for swinging movement relative thereto about an axis transverse to said axis of oscillation for selectively operably connecting said operating member with said rails, means urging said selector element into operable engagement with one of said rails, said element having a portion adapted for engagement with the other rail to lock the same against shifting, means for swinging said element to operably engage said other rail and simultaneously unlock the same for shifting and means for operating said oscillating member.

2. In a motor vehicle power transmission having a pair of selectively operable drive control elements, a pair of rails mounted for shifting movement relative to each other along parallel axes, means operably connecting said rails respectively with said drive control elements, an operating member mounted for oscillatory movement about an axis transverse to said parallel axes to impart shifting movement to said rails, a selector element pivotally mounted on said operating member for swinging movement relative thereto about an axis transverse to said axis of oscillation for selectively operably connecting said operating member with said rails, said element having a finger for engaging said rails to shift the same and a lock portion for engaging and locking one of said rails against shifting while the other is being shifted, means for swinging said element, and means for oscillating said operating member.

3. In a change speed transmission, a pair of rails mounted for reciprocation along parallel axes, means associated with said rails for introducing a plurality of driving ratios, a rockshaft extending transversely to said rails, a selector element swingably carried on said rockshaft and having a finger adapted to selectively engage said rails for shifting the same in response to rocking of said rockshaft, and cooperating engagement means on said element and one of said rails adapted for engagement when said finger is engaged with the other of said rails to lock said one rail against reciprocation.

4. In a motor vehicle power transmission having a pair of selectively operable drive control elements, a pair of rails mounted for shifting movement relative to each other along parallel axes, means operably connecting said rails respectively with said drive control elements, a shaft mounted for oscillatory movement about an axis transverse to said parallel axes, a selector element carried by said shaft for swinging relative thereto about an axis transverse to the axis of oscillation thereof, a shift finger carried by said element for selectively engaging said rails in response to swinging of said element, means carried by said element for engaging one of said rails to lock the same against shifting when said finger is engaged with the other of said rails, means for swinging said element, and means for oscillating said shaft.

5. In a motor vehicle power transmission having a pair of selectively operable drive control elements, a pair of rails mounted for shifting movement relative to each other along parallel axes, means operably connecting said rails respectively with said drive control elements, an oscillatable shaft disposed transversely to said parallel axes, a trunnion member surrounding said shaft and carried thereby for rocking on an axis disposed at right angles to the axis of said shaft, a finger carried by said trunnion member, means for rocking said trunnion member to selectively engage said finger with said rails, a spring carried by said shaft and engaging said trunnion member for urging the same to a position wherein said finger is engaged with one of said rails, said other rail having a recess receiving a portion of said trunnion member when the finger is engaged with the said one rail whereby said other rail is locked against shifting, and means for oscillating said shaft.

6. In a motor vehicle power transmission having a pair of selectively operable drive control elements, a pair of rails mounted for shifting movement relative to each other along parallel axes, means operably connecting said rails respectively with said drive control elements, an oscillatable shaft disposed transversely to said parallel axes, a trunnion member surrounding said shaft and carried thereby for rocking on an axis disposed at right angles to the axis of said shaft, a finger carried by said trunnion member, means yieldably maintaining said trunnion member in such position that said finger is engaged with one of said rails whereby said rail will be shifted upon oscillation of said shaft, said other rail having a recess receiving a portion of said trunnion member when the member is in its aforesaid position whereby said other rail is locked against shifting, and means for oscillating said shaft.

7. In a motor vehicle power transmission having a pair of selectively operable drive control elements, a pair of rails mounted for shifting movement relative to each other along parallel axes, means operably connecting said rails respectively with said drive control elements, an oscillatable shaft disposed transversely to said parallel axes, a trunnion member surrounding said shaft and carried thereby for rocking on an axis disposed at right angles to the axis of said shaft, a finger carried by said trunnion member, means for rocking said trunnion member to selectively engage said finger with said rails, a spring carried by said shaft and engaging said trunnion member for urging the same to a position wherein said finger is engaged with one of said rails, said other rail having a recess receiving a portion of said trunnion member when the finger is engaged with the said one rail whereby said other rail is locked against shifting, and means for controlling said shaft and trunnion member comprising a manually operable lever mounted for shifting movement along transversely connected paths, and connections between said lever and said shaft and trunnion member so constructed and arranged that swinging of said lever in said respective paths will oscillate said shaft and rocking of said lever between said paths will cause corresponding rocking of said trunnion member.

8. The combination set forth in claim 7 wherein the connecting means between said lever and trunnion member is operable in one direction only for urging movement of said trunnion in opposition to said spring.

9. In a motor vehicle power transmission having a pair of selectively operable drive control elements, a pair of rails mounted for shifting movement relative to each other along parallel axes, means operably connecting said rails respectively with said drive control elements, a member mounted for rocking in one plane and for oscillation in another plane for selecting and shifting said rails respectively, means including said member and operable by rocking thereof for locking one of said rails against shift while the other is shifted, and means for constantly urging said member into locking position with respect to said one rail.

10. In a motor vehicle power transmission having a pair of selectively operable drive control elements, a pair of rails mounted for shifting movement relative to each other along parallel axes, means operably connecting said rails respectively with said drive control elements, an operating shaft mounted for oscillatory movement about an axis transverse to said parallel axes to impart shifting movement to said rails, a selector mechanism mounted on said shaft, said selector mechanism comprising an annular member loosely surrounding said shaft and rockable relatively thereto, a loose pin rockably mounting said member on said shaft, a spring clip carried by said member for retaining said pin against escape, and a finger integrally formed on said member and adapted to selectively engage said rails.

11. In a motor vehicle power transmission having a pair of selectively operable drive control elements, a pair of rails mounted for shifting movement relative to each other along parallel axes, means operably connecting said rails respectively with said drive control elements, one of said rails having a portion carried thereby forming an arcuate recess, an annularly shaped member mounted for rocking movement and having a finger adapted to selectively engage said rails, said recess being adapted to receive a portion of said member in one of its rocked positions thereby to lock said rail against movement, and means for oscillating said member in the direction of said axes to shift said rails.

12. The combination set forth in claim 11 wherein the means for rocking and for oscillating said member comprises a manually operable lever swingable in two parallel paths of movement, and means interconnecting said lever and said member so constructed and arranged that swinging movement in said paths oscillates said member and rocking of said lever between said paths rocks said member.

OTTO E. FISHBURN.